(12) United States Patent
Cacioppo

(10) Patent No.: US 12,065,178 B1
(45) Date of Patent: Aug. 20, 2024

(54) KINETIC ENERGY CONVERSION SYSTEM

(71) Applicant: Peter Cacioppo, Cedar Rapids, IA (US)

(72) Inventor: Peter Cacioppo, Cedar Rapids, IA (US)

( * ) Notice: Subject to any disclaimer, the term of this patent is extended or adjusted under 35 U.S.C. 154(b) by 459 days.

(21) Appl. No.: 17/529,730

(22) Filed: Nov. 18, 2021

Related U.S. Application Data (60) Provisional application No. 63/115,937, filed on Nov. 19, 2020.

(51) Int. Cl.
| | | |
|---|---|---|
| *B61B 13/00* | (2006.01) | |
| *B61K 13/00* | (2006.01) | |
| *H02K 7/18* | (2006.01) | |
| *H02K 53/00* | (2006.01) | |

(52) U.S. Cl.
CPC .............. *B61B 13/00* (2013.01); *B61K 13/00* (2013.01); *H02K 7/1861* (2013.01); *H02K 53/00* (2013.01)

(58) Field of Classification Search
CPC ...... H02K 7/1861; B61B 13/00; B61K 13/00; F03G 7/081; F03G 7/083; F03G 7/085; F03D 9/32
USPC .......................................................... 290/1 R
See application file for complete search history.

(56) References Cited

U.S. PATENT DOCUMENTS

| | | | |
|---|---|---|---|
| 4,092,554 A | 5/1978 | Quinn | |
| 4,239,974 A | 12/1980 | Swander et al. | |
| 4,806,805 A | 2/1989 | Pinchefsky | |
| 6,515,878 B1 | 2/2003 | Meins et al. | |
| 7,098,553 B2 * | 8/2006 | Wiegel | F03D 9/25 |
| | | | 290/55 |
| 7,102,244 B2 | 9/2006 | Hunter, Jr. | |
| 7,164,211 B1 | 1/2007 | Tafoya et al. | |
| 7,830,071 B2 | 11/2010 | Abramovich et al. | |
| 8,123,431 B2 | 2/2012 | Chen | |
| 8,177,479 B2 | 5/2012 | Watts | |
| 8,911,703 B2 | 12/2014 | McAlister | |
| 9,735,712 B2 | 8/2017 | Erickson | |
| 9,944,192 B2 | 4/2018 | Ricci | |
| 10,253,759 B2 | 4/2019 | Souryal | |
| 10,325,717 B2 | 6/2019 | Boys et al. | |

(Continued)

FOREIGN PATENT DOCUMENTS

| | | | | |
|---|---|---|---|---|
| DE | 102007016872 A1 * | 10/2008 | ............ | B60L 15/005 |
| GB | 2494119 | 3/2013 | | |

(Continued)

*Primary Examiner* — Julio C. Gonzalez
(74) *Attorney, Agent, or Firm* — John Rizvi; John Rizvi, P.A—The Patent Professor (57) ABSTRACT

A kinetic energy conversion system generates usable electrical energy from the kinetic energy of a plurality of railroad cars moving along a designated section of a railroad track of a railway network. The system includes a magnetic rotor assembly including at least one rotor unit having at least one magnet mounted thereto, and an axle attached to the rotor unit. A generator assembly having at least one electrical generator is disposed in an operative engagement with the magnetic rotor assembly to generate an amount of electrical energy. A support assembly dimensioned and configured to maintain at least one rotor unit in a magnetically proximate orientation relative to the plurality of railroad cars moving along the designated section of the railroad track causing rotation thereof resulting in the generation of electrical energy by the electrical generator.

14 Claims, 7 Drawing Sheets

(56) References Cited

U.S. PATENT DOCUMENTS

| | | |
|---|---|---|
| 2005/0121242 A1 | 6/2005 | Robinson |
| 2009/0057084 A1 | 3/2009 | Mahawilli |
| 2009/0166142 A1 | 7/2009 | Hyun et al. |
| 2009/0173589 A1 | 7/2009 | Nejmeh |
| 2010/0283266 A1* | 11/2010 | Shafiq .................. H02K 53/00 74/DIG. 9 |
| 2011/0109158 A1 | 5/2011 | Olsen |
| 2011/0163542 A1 | 7/2011 | Farkas |
| 2015/0188389 A1 | 7/2015 | Wan et al. |
| 2017/0182903 A1 | 6/2017 | Kwasnisck et al. |
| 2018/0159417 A1 | 6/2018 | Flankl et al. |

FOREIGN PATENT DOCUMENTS

| | | |
|---|---|---|
| JP | 5425449 | 2/2014 |
| WO | WO2010114347 | 10/2010 |
| WO | WO2013180616 | 12/2013 |

* cited by examiner

KINETIC ENERGY CONVERSION SYSTEM

CROSS-REFERENCE TO RELATED APPLICATIONS

This application claims the benefit of U.S. Provisional Patent Application Ser. No. 63/115,937, filed on Nov. 19, 2020, which is incorporated by reference herein in its entirety.

FIELD OF THE INVENTION

The present invention relates generally to a kinetic energy conversion system.

BACKGROUND OF THE INVENTION

As the population of the planet continues to grow at an accelerated pace, having doubled in the past 50 years and having nearly tripled in the past 70 years, the planet's demand and consumption of various forms of energy continue to grow at an equally accelerated pace, and perhaps even greater.

In the United States, nearly 80% of the energy consumed in this country at the present time is generated from nonrenewable fossil fuel sources such as petroleum, natural gas, and coal. There has long been concern about the inevitable dwindling of the sources of such nonrenewable fossil fuels, or at least as to those strategic fossil fuel stores which remain under the control of the United States and/or its allies. A further, and perhaps more pressing concern has been expressed, both here and abroad, with regard to the greenhouse gas emissions which are a known byproduct of the consumption of fossil fuels. More in particular, concerns have been raised with regard to the potential impact that large qualities of greenhouse gas emissions may have on global climate change which remains the subject of an oftentimes heated global debate, particularly in coastal regions of the United States and elsewhere in the world where concerns for sea level rise are being witnessed on a regular basis.

Aside from the aforementioned nonrenewable fossil fuel sources, the United States generates less than 10% of the energy consumed in this country from nuclear powered reactors, which present their own concerns for safety while in operation, as well as for the safe and secure disposal of the nuclear waste generated from the reactors, which will remain hazardous and dangerous for thousands of years to come.

Lastly, the United States currently supplies roughly 10% of its energy demand via renewable energy sources, most notably, hydroelectric, solar, wind and geothermal powered electrical energy generating sources.

As is readily apparent from the foregoing, despite the considerable environmental impacts in obtaining, transporting, processing, and using nonrenewable fossil fuels, as well as the concerns related to threats to the strategic fossil fuel stores, impacts which have been well known for a half a century or more, the United States, and in fact, the world, have done little to significantly reduce reliance upon these nonrenewable fossil fuel resources.

One potentially untapped renewable energy source comes from the kinetic energy which is produced by the numerous vehicles crisscrossing our planet every minute of every day, oftentimes powered by the very nonrenewable fossil fuel sources described above. As is well known, for a variety of reasons, many of our most common modes of transportation are constructed if not primarily at least partially of ferrous metals, such as iron and steel. As is also well known, most common magnets are strongly attracted to ferrous metals.

As such, various devices and systems have been contemplated in order to "capture" the kinetic energy which is produced by various land-based vehicles such as automobiles and/or trains. Many of these contemplated devices and systems require some form of retrofit to the vehicle, such as attaching one or more magnets or electromagnets or other such components thereto, in order to interact with a stationary component such as may be embedded under or along a roadway or railway track.

It is interesting to note that, to date, none of these contemplated devices or systems for the "capture" of kinetic energy produced by various land-based vehicles, once again, such as automobiles and/or trains, are believed to have been implemented on any commercial scale, thus having a negligible impact on reducing reliance upon nonrenewable fossil fuel resources.

Accordingly, there is an established need for a solution to the aforementioned problems and shortcomings of currently known systems.

SUMMARY OF THE INVENTION

The present invention is directed to a kinetic energy conversion system.

In a first implementation of the invention, a kinetic energy conversion system generates usable electrical energy from the kinetic energy of a plurality of railroad cars moving along a designated section of a railroad track of a railway network, and the system may comprise: a magnetic rotor assembly including at least one rotor unit having at least one magnet mounted thereto; the magnetic rotor assembly also having an axle attached to the at least one rotor unit; a generator assembly having at least one electrical generator disposed in an operative engagement with the magnetic rotor assembly to generate an amount of electrical energy; and, a support assembly dimensioned and configured to maintain at least one rotor unit in a magnetically proximate orientation relative to the plurality of railroad cars constructed at least partially of ferrous material moving along the designated section of the railroad track.

In a second aspect, the kinetic energy conversion system can include an axle which is movable with at least one rotor unit, and in one further embodiment, the system can include an axle which is rotatable with at least one rotor unit about a rotational axis thereof.

In another aspect, the kinetic energy conversion system may have at least one rotor unit comprises at least one magnet housing, wherein at least one magnet is disposed in the at least one magnet housing and at least a portion of the at least one magnet is movable out of the at least one magnet housing into a magnetically attractive orientation relative to the plurality of railroad cars moving along the designated section of the railroad track.

In a further aspect, the kinetic energy conversion system can include a magnetically attractive force between at least one magnet of the at least one rotor unit and the plurality of railroad cars moving along the designated section of the railroad track which causes the at least one rotor unit and the axle attached thereto to rotate about a rotational axis thereof.

In one other aspect, the kinetic energy conversion system may have an operative engagement between at least one electrical generator and a magnetic rotor assembly which is at least partially defined by a portion of an axle interconnected to an armature disposed in a rotational configuration with a stator in the at least one electrical generator, wherein rotation of the axle causes rotation of the armature relative to the stator, thereby generating an amount of electrical energy.

In yet another aspect, the kinetic energy conversion system can include at least one rotor unit having a plurality of magnets mounted thereto and a corresponding plurality of magnet housings, wherein each of the plurality of magnets is disposed in a corresponding one of the plurality of magnet housings and at least a portion of each of the plurality of magnets is moveable out of the corresponding one of the plurality of magnet housings into a magnetically attractive orientation relative to the plurality of railroad cars moving along the designated section of the railroad track.

In still one further aspect, the kinetic energy conversion system may have a magnetically attractive force between each of the plurality of magnets of the at least one rotor unit and the plurality of railroad cars moving along the designated section of the railroad track which causes the at least one rotor unit and the axle attached thereto to rotate about a rotational axis thereof.

In yet one other aspect, the kinetic energy conversion system can include a kinetic energy conversion system which generates usable electrical energy from the kinetic energy of a plurality of railroad cars moving along a designated section of a railroad track of a railway network, the system comprising: a magnetic rotor assembly including at least one rotor unit having a plurality of magnets mounted thereto in a spaced apart arrangement about a circumference of the at least one rotor unit, each of the plurality of magnets having a proximal end and a distal end; the magnetic rotor assembly having an axle attached to the at least one rotor unit and rotatable therewith along a rotational axis thereof; a generator assembly having a plurality of electrical generators each disposed in an operative engagement with the magnetic rotor assembly to generate an amount of electrical energy; a control assembly having a controller in a communicative relation with at least the generator assembly to dispose the plurality of electrical generators between a static mode and a generating mode; and a support assembly dimensioned and configured to maintain the at least one rotor unit in a magnetically proximate orientation relative to the plurality of railroad cars constructed at least partially of ferrous material moving along the designated section of the railroad track.

In still another aspect, the kinetic energy conversion system may have a control assembly further comprising at least one pressure sensor positioned in a portion of the railroad track proximate to the designated section of the railroad track and disposed in communication with a controller, the at least one pressure sensor actuated by the weight of one of the plurality of railroad cars on the portion of the railroad track in which the at least one pressure sensor is positioned, wherein upon actuation of the at least one pressure sensor the controller disposes at least one electrical generator into a generating mode.

In yet one further aspect, the kinetic energy conversion system can include a control assembly further comprises a plurality of pressure sensors each positioned in a different portion of the railroad track proximate to but oppositely disposed from the designated section of the railroad track and each disposed in communication with a controller, each of the plurality of pressure sensors independently actuated by the weight of one of the plurality of railroad cars on the portion of the railroad track in which a corresponding one of the plurality of pressure sensors is positioned, wherein upon actuation of the at least one pressure sensor the controller disposes one or more of a plurality of electrical generators into a generating mode.

In still one other aspect, the kinetic energy conversion system may have a kinetic energy conversion system which generates usable electrical energy from the kinetic energy of a plurality of railroad cars moving along a designated section of a railroad track of a railway network, the system comprising: a magnetic rotor assembly including a plurality of rotor units each having a plurality of magnets mounted thereto in a spaced apart arrangement about a circumference thereof; each of the plurality of rotor units having an axle attached thereto and rotatable therewith; a support assembly dimensioned and configured to maintain each of the plurality of rotor units in a magnetically proximate orientation relative to the plurality of railroad cars moving along the designated section of the railroad track; a magnetically attractive force between successive ones of the plurality of magnets of each of the plurality of rotor units and the plurality of railroad cars constructed at least partially of ferrous material moving along the designated section of the railroad causes each of the plurality of rotor units and the axle attached thereto to rotate about a rotational axis thereof; and, a generator assembly having a plurality of electrical generators each disposed in an operative engagement with a corresponding one of the plurality of rotor units, wherein the operative engagement between each of the plurality of electrical generators and a corresponding one of the plurality of rotor units is at least partially defined by a portion of each axle interconnected to an armature disposed in a rotational configuration with a stator in a corresponding one of the plurality of electrical generators, wherein rotation of the axle causes rotation of the armature relative to the stator, thereby generating the amount of electrical energy.

In yet another aspect, the kinetic energy conversion system can include an accelerator assembly having one or more accelerator fins attached to a rotor unit, wherein each accelerator fin is dimensioned and configured to provide a smooth transitional surface for airflow over and around a corresponding one of a plurality of magnets and/or a corresponding one of a plurality of magnet housings attached to a rotor unit during rotation thereof.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "top", "bottom", "left", "right", "front", "rear", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to kinetic energy conversion system, generally as shown as at 100, 100' throughout the figures.

Figure 1:
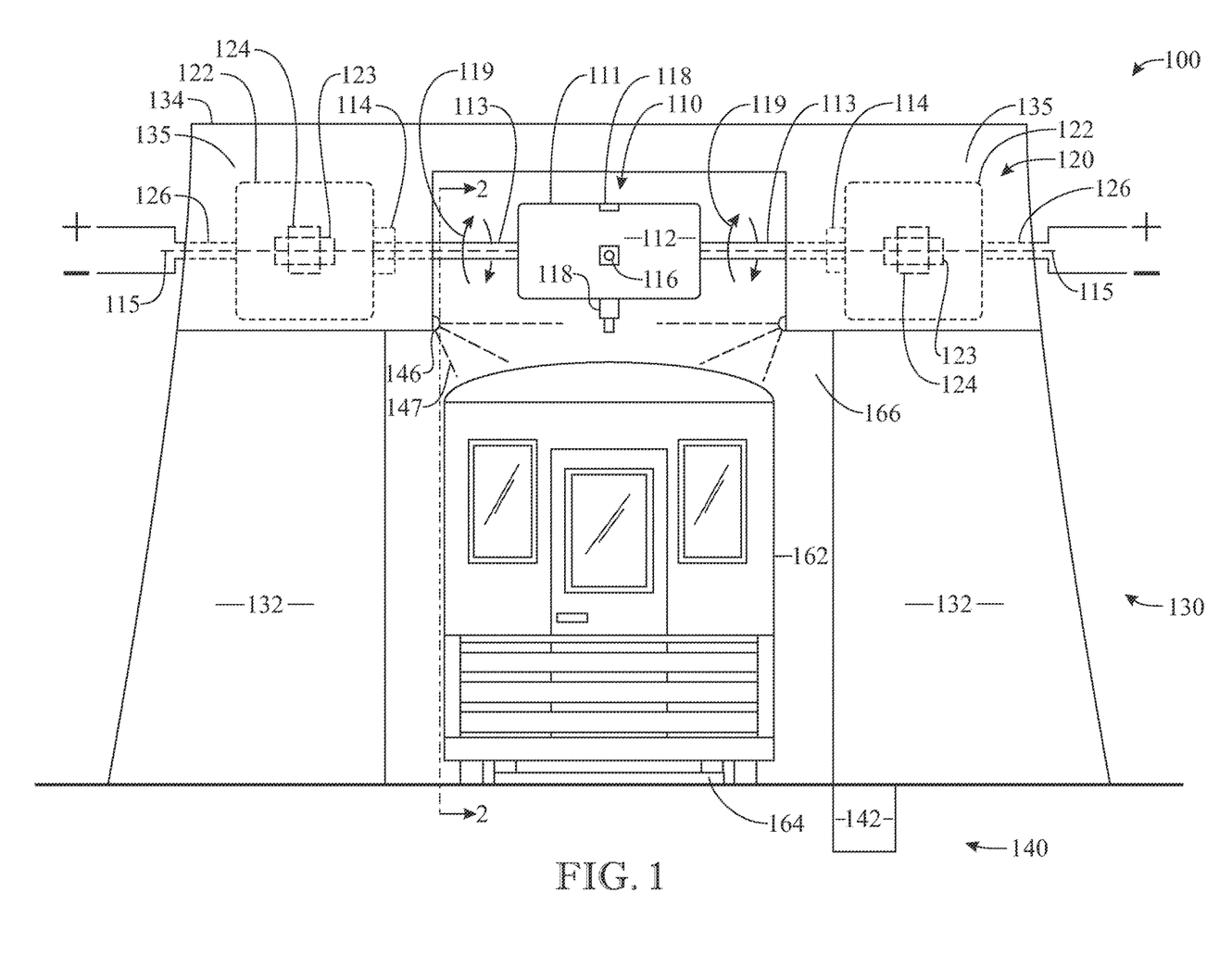
FIG. 1 presents an elevation of one illustrative embodiment of a kinetic energy conversion system, in accordance with the present invention.
Figure 2:
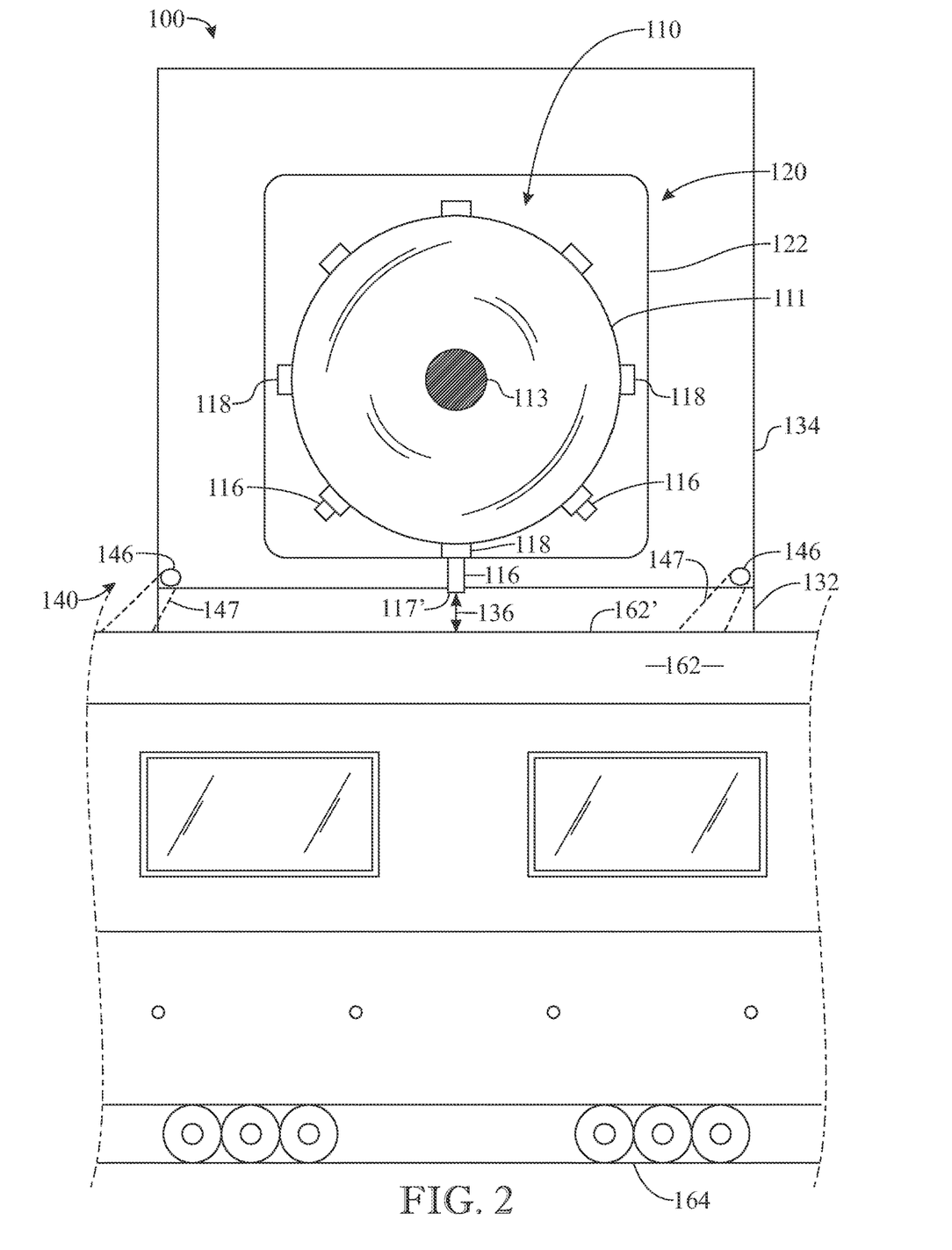
FIG. 2 presents a partial cutaway elevation of the kinetic energy conversion system of FIG. 1 along lines 2-2 thereof, in accordance with the present invention.

Referring initially to FIGS. 1 and 2, presented therein are an elevation of one illustrative embodiment of a kinetic energy conversion system 100 and a partial cutaway elevation of the kinetic energy conversion system 100, respectively, in accordance with the present invention. A kinetic energy conversion system 100 includes a magnetic rotor assembly 110 which is disposed in an operative engagement with a generator assembly 120 in order to generate an amount of electrical energy from the kinetic energy produced by a plurality of standard railroad cars 162 moving along a designated section of a railroad track 164 of a railway network 160. As one example, a designated section of railroad track 164 may be located under and through a railway underpass 166 such as is shown by way of example in the illustrative embodiment of FIG. 1. As another example, a designated section of railroad track 164 may be disposed through a railway tunnel 168 such as is shown by way of example in the illustrative embodiment of FIG. 4. Of course, it is equally within the scope and intent of the present invention for a designated section of railroad track 164 to be located over bridges or wide open plains, the key being a plurality of railroad cars travelling on the designated section of the railroad tracks 164 proximate a kinetic energy conversion system 100, 100' in accordance with the present invention.

A magnetic rotor assembly 110 in accordance with the present invention comprises at least one rotor unit 111. In at least one embodiment, a rotor unit 111 comprises a generally regular cylindrical configuration at least partially defining an outer surface 112 having a circumference therearound. It is to be appreciated that a rotor unit 111 comprising other geometric configurations, such as, by way of example only, square, rectangular, oval, conical, etc., are also within the scope and intent of the present invention. A rotor unit 111 in accordance with the present invention may be constructed from any of a variety of sufficiently rigid materials of construction such as metal, metal alloys, plastics, composite materials, etc. In at least one embodiment, a rotor unit 111 comprises a lightweight material of construction and in at least one further embodiment, a rotor unit 111 comprises a substantially hollow construction so as to minimize its weight to facilitate rotation thereof about a rotational axis 115, as is discussed in greater detail hereinafter.

A magnetic rotor assembly 110 further comprises an axle 113 attached to at least one rotor unit 111 via any of variety of mechanical fastening means, such that the axle 113 is movable with the rotor unit 111. In at least one embodiment, an axle 113 is rotational with the rotor unit 111 about rotational axis 115 thereof. An axle 113 in accordance with one embodiment of the present invention is attached to one end of a rotor unit 111, such as may be seen best in the illustrative embodiment FIG. 5. Alternatively, an axle 113 may be attached to opposite ends of a rotor unit 111, such as is shown best in the illustrative embodiment of FIG. 1. It is to be appreciated that an axle 113 may comprise a unitary construction with a rotor unit 111, in accordance with at least one embodiment of the present invention. It is further to be appreciated that an axle 113 may comprise a single continuous construction mounted through and extending outwardly from opposite ends of a rotor unit 111. In at least one further embodiment, an axle 113 may comprise two separate members each attached to oppositely disposed ends of a rotor unit 111, once again, for purposes of reducing the overall weight of the combined rotor unit 111 and axle 113 so as to facilitate rotation thereof about a rotational axis 115, such as is shown by way of example in the illustrative embodiment of FIG. 1.

In at least one embodiment, a magnetic rotor assembly 110 comprises at least one axle bearing unit 114 dimensioned and configured to receive at least a portion of an axle 113 therethrough. More in particular, and axle bearing unit 114 is provided to support as well as to facilitate rotation of an axle 113 upon rotation of the rotor unit 111 to which is attached. In at least one embodiment, an axle bearing unit 114 comprises substantially frictionless bearings, once again, so as to facilitate rotation of the axle and the rotor unit 111 to which it is attached about a rotational axis 115 thereof.

A magnetic rotor assembly 110 in accordance with the present invention further comprises at least one magnet 116 mounted to a portion of at least one rotor unit 111. In at least one embodiment, at least one magnet 116 is mounted to a portion of a rotor unit 111 such that a distal end 117' of the at least one magnet 116 is disposed in an outwardly extending and magnetically attractive orientation relative to a plurality of railroad cars 162 which are constructed at least partially of ferrous material moving along a designated section of a railroad track 164. In at least one further embodiment, the magnetic rotor assembly 110 comprises a plurality of magnets 116 mounted to at least one rotor unit 111. With reference once again to FIGS. 1 and 2, in at least one embodiment, a magnetic rotor assembly 110 comprises a plurality of magnets 116 mounted to a rotor unit 111 in a spaced apart arrangement about a circumference of an outer surface 112 of a rotor unit 111.

With continued reference to FIGS. 1 and 2, in at least one embodiment of a kinetic energy conversion system 100 in accordance with the present invention, a magnetic rotor assembly 110 includes a rotor unit 111 having a plurality of magnet housings 118 attached thereto in a spaced apart arrangement about the circumference of the outer surface 112 of the rotor unit 111. A magnetic rotor assembly 110 in one embodiment includes a plurality of magnets 116 each disposed in a corresponding one of a plurality of magnet housings 118. In at least one further embodiment, at least a portion of each of a plurality of magnets 116, i.e., a distal end 117' of each of the plurality of magnets 116, is at least partially movable out of a corresponding one of the plurality of magnet housings 118 into a magnetically attractive orientation relative to the plurality of standard railroad cars 162, which are constructed at least partially of ferrous material and thus require no retrofitting or other modification in order for the present system 100 to operate in conjunction therewith, wherein the plurality of railroad cars 162 are moving along the designated section of the railroad track 164, such as is shown in the illustrative embodiments of FIGS. 1 and 2. It is appreciated that in at least one embodiment, one or more of a plurality of magnets 116 may be fixedly mounting in a corresponding one of a plurality of magnet housings 118 such that a distal end 117' of each extends outwardly therefrom, and further, each of the plurality of magnets 116 may be mounted directly to a rotor unit 11, as previously described hereinabove.

Figure 6:
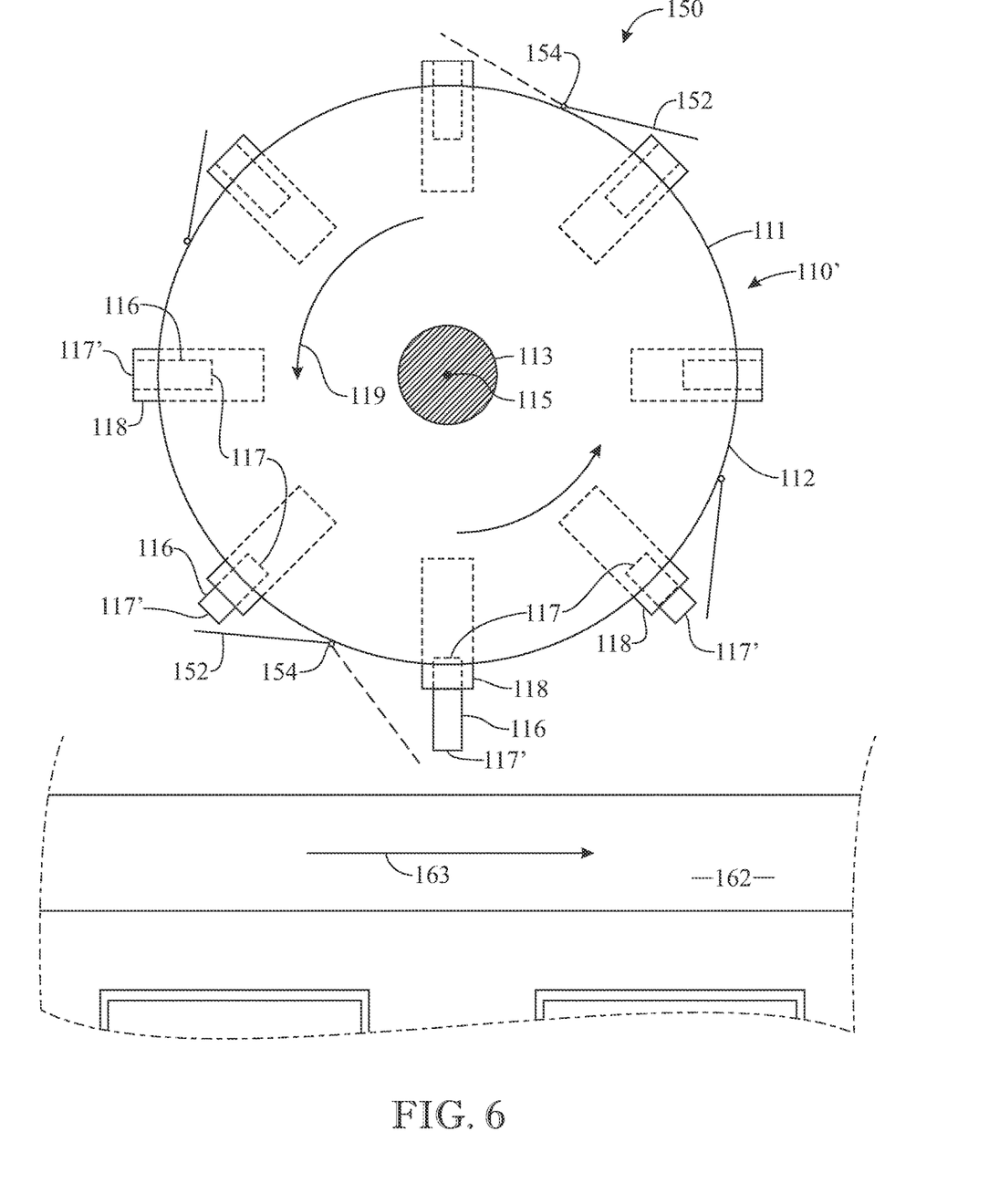
FIG. 6 presents a partial cutaway side elevation of another alternative illustrative embodiment of a magnetic rotor assembly of a kinetic energy conversion system, in accordance with the present invention.

With reference to FIG. 6, in at least one embodiment, each of a plurality of magnets 116 comprises an elongated configuration having a proximal end 117 which remains disposed within a corresponding magnet housing 118 and a distal end 117' which is at least partially movable into and out of the corresponding magnet housing 118 into and out of a magnetically attractive orientation relative to the plurality of railroad cars 162 moving along the designated section of the railroad track 164. It is to be appreciated that the magnetically attractive force between successive ones of said plurality of magnets 116 of a rotor unit 111 in accordance with at least one embodiment of the present invention, and the plurality of railroad cars 162 constructed at least partially of ferrous material moving along a designated section of railroad track 164 causes the rotor unit 111 and the axle 113 attached thereto to rotate about a rotational axis 115 thereof.

As before, a kinetic energy conversion system 100 includes a magnetic rotor assembly 110 in accordance with the present invention disposed in an operative engagement with a generator assembly 120 in order to generate an amount of electrical energy. A generator assembly 120, in one embodiment, includes at least one electrical generator unit 122. In its simplest form, an electrical generator unit 122 in accordance with the present invention includes an armature 123 which is disposed in a rotational configuration relative to a fixed stator 124, wherein movement, i.e., rotation, of the armature 123 relative to the stator 124 results in the generation of usable electrical energy. It is understood and appreciated to be within the scope and intent of the present invention for an electrical generator unit 122 to comprise any of a number of devices which generate electrical energy by the rotation of one component relative to at least one other component thereof.

In at least one embodiment, a kinetic energy conversion system 100 includes a magnetic rotor assembly 110 disposed in an operative engagement with at least one electrical generator unit 122 of a generator assembly 120 in order to generate an amount of electrical energy. Operative engagement between at least one electrical generator 122 and a magnetic rotor assembly 110 is at least partially defined by a portion of an axle 113 attached to a rotor unit 111 being interconnected to an armature 123 disposed in a rotational configuration with a stator 124 of at least one electrical generator 122, wherein rotation of the rotor unit 111 results in rotation of the axle 113 causing rotation of the armature 123 interconnected thereto relative to the stator 124, thereby generating an amount of electrical energy.

More in particular, and as above, the magnetically attractive force between successive ones of said plurality of magnets 116 of a rotor unit 111 disposed in a magnetically proximate orientation relative to the plurality of railroad cars 162 which are constructed at least partially of ferrous material moving along a designated section of railroad track 164 causes the rotor unit 111 and the axle 113 attached thereto to rotate about a rotational axis 115 thereof. As will be further appreciated, rotation of the rotor unit 111 as a result of the magnetically attractive force between the plurality of magnets 116 mounted thereto and the plurality of railroad cars 162 moving along a railroad track proximate thereto causes the axle 113 to rotate, which in turn causes the armature 123 interconnected to the axle 113 to rotate as well relative to a stator 124 in at least one electrical generator unit 122, thus generating an amount of electrical energy from the kinetic energy of the plurality of railroad cars 162 moving along a designated section of railroad track 164, in accordance with at least one embodiment of a kinetic energy conversion system 100, 100' of the present invention.

In at least one further embodiment, such as is shown by way of example in the illustrative embodiment of FIG. 1, a kinetic energy conversion system 100 includes a magnetic rotor assembly 110 disposed in operative engagement with a plurality of oppositely disposed electrical generator units 122 of a generator assembly 120 in order to generate an amount of electrical energy. As may be seen from FIG. 1, the generator assembly 120 comprises a plurality of electrical generator units 122 each disposed on opposite sides of the rotor unit 111 of the magnetic rotor assembly 110. More in particular, a rotor unit 111 in at least one embodiment has an axle 113 having one end attached thereto and extending outwardly from opposite ends of the rotor unit 112 along the rotational axis 115 thereof, such as is shown best in the illustrative embodiment of FIG. 1. As further shown in FIG. 1, opposite ends of the axle 113 are each interconnected to an armature 123 corresponding to each of the plurality of oppositely disposed electrical generator units 122. Further, each armature 123 interconnected to oppositely disposed ends of the axle 113 is disposed in a rotational configuration with a corresponding stator 124 of each of the plurality of oppositely disposed electrical generator units 122. As such, and as before, rotation of the rotor unit 111 and the axle 113 attached thereto along rotational axis 115 causes each of the armatures 123 of each of the electrical generator units 122 to rotate relative to a corresponding stator 124 disposed in each, thus generating electrical energy from the kinetic energy of the plurality of railroad cars 162 moving along a designated section of railroad track 164.

Figure 3:
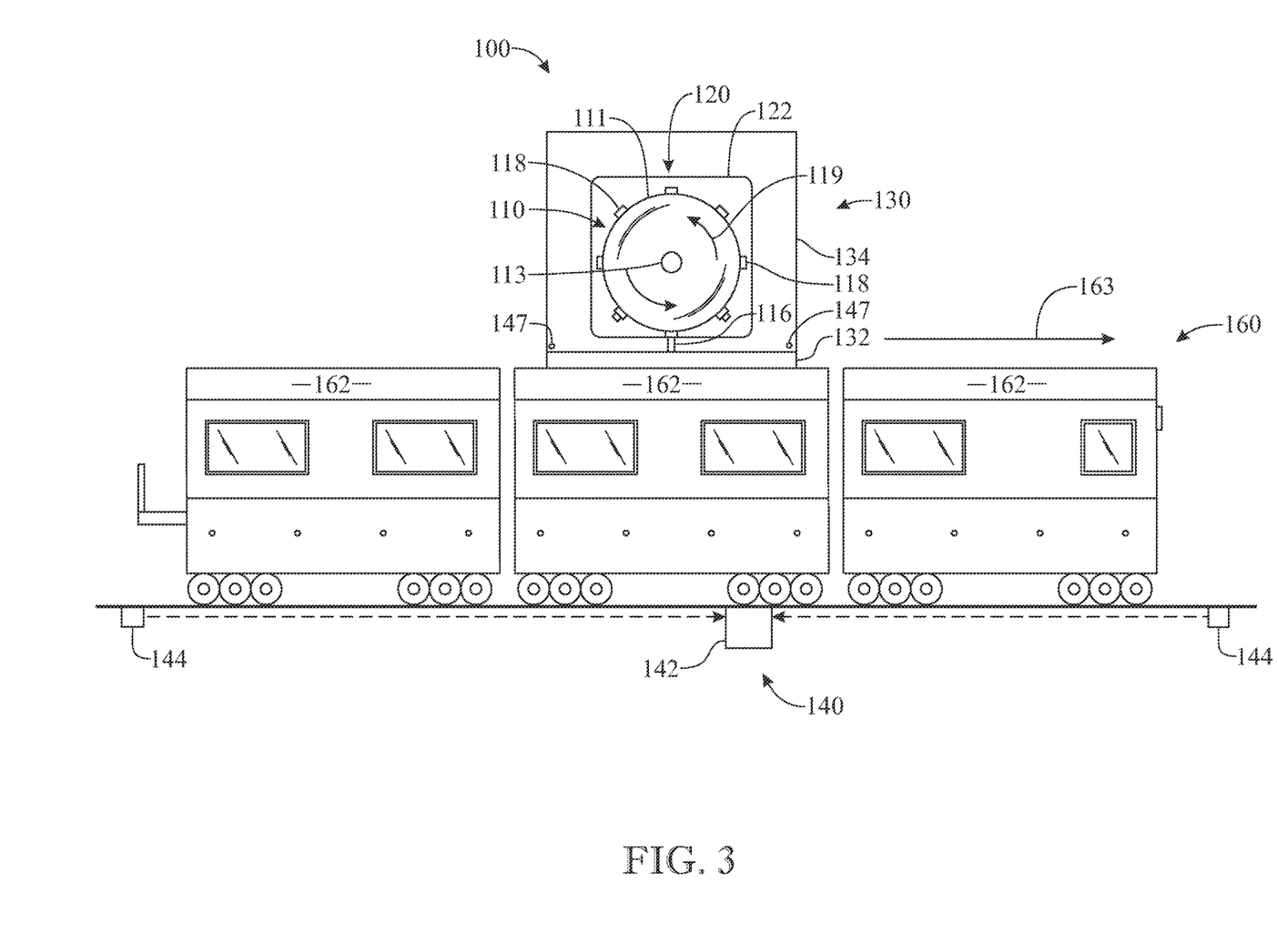
FIG. 3 presents another partial cutaway elevation of the kinetic energy conversion system of FIG. 1, in accordance with the present invention.

With further reference to the illustrative embodiment of FIGS. 1 and 3, a rotational direction 119 of a rotor unit 111 about a rotational axis 115 thereof, and thus the direction in which an axis 113 and an armature 123 interconnected thereto will rotate, depends upon the direction of travel 163 of a plurality of railroad cars 162 on a designated portion of a railroad track 164 proximate the present kinetic energy conversion system 100. As such, in at least one embodiment of the present invention, an electrical generator unit 122 is bidirectional, meaning that the electrical generator unit 122 will generate an amount of electrical energy upon rotation of an armature 123 relative to a stator 124 mounted therein regardless of the direction in which an axis 113 and an armature 123 interconnected thereto rotates, whether forward or backward, clockwise or counterclockwise, or otherwise.

With continued reference once again to FIG. 1, in at least one embodiment a generator assembly 120 further comprises an electrical output interface 126. More in particular, an electrical output interface 126 is provided to transfer the amount of electrical energy generated by a generator assembly 120 of a kinetic energy conversion system 100 in accordance with the present invention in a usable form. As one example, an electrical output interface 126 may be interconnected to an array of electrical storage batteries such that the electrical energy stored therein may be accessed by an end user on an as needed basis. As one other example, electrical output interface 126 may be interconnected directly to an electrical grid proximate to a kinetic energy conversion system 100 in accordance with the present invention is installed.

A kinetic energy conversion system 100 in accordance with the present invention further comprises a support assembly 130. In at least one embodiment, a support assembly 130 is dimensioned and configured to maintain at least one rotor unit 111 of a magnetic rotor assembly 110 in a magnetically proximate orientation relative to a plurality of railroad cars 162 moving along a designated section of a railroad track 164 of a railway network 160. In at least one embodiment, a support assembly 130 comprises at least one lower support 132 disposed in an underlying and supporting relation to an upper support 134. With reference once again to FIG. 1, a support assembly 130 in at least one further embodiment comprises a plurality of lower supports 132 each disposed in a spaced apart relation relative to one another along opposite sides of a designated section of a railroad track 164 and in an underlying and supporting relation to an upper support 134, thereby forming a railway underpass 166. As best seen in FIG. 1, support assembly 130 is dimensioned and configured to maintain the rotor unit 111 of the magnetic rotor assembly 110 in a magnetically proximate orientation relative to the plurality of railroad cars 162. As further seen in FIG. 1, in at least one embodiment, the upper support 134 of support assembly 130 comprises a generator housing 135 dimensioned and configured to permit a corresponding one of the plurality of electrical generator units 122 of generator assembly 120 to be operatively installed therein. In at least one embodiment, a support assembly 130 and/or at least major components thereof are constructed of a magnetically shielded material so as to prevent electromagnetic interference to people, animals, structures, and/or devices living and/or operating proximate a kinetic energy conversion system 100 in accordance with the president.

In at least one embodiment, a kinetic energy conversion system 100 in accordance with the present invention further comprises a control assembly 140. A control assembly 140 in at least one embodiment includes a controller 142 which is disposed in a communicative relation with one or more sensors which transmit detected operational parameters to the controller 142 to facilitate operation of the present kinetic energy conversion system 100. With reference once again to FIGS. 1 and 2, a control assembly 140 comprising a controller 142 is diagrammatically represented therein. In one embodiment, a control assembly 140 includes at least one pressure sensor 144 positioned in a portion of a railroad track 164 which is proximate to but spaced apart from the designated section of the railroad track 164 about which a magnetic rotor assembly 110 and generator assembly 120 of the present kinetic energy conversion system 100 are disposed. In one further embodiment, a control assembly 140 includes a plurality of pressure sensors 144 which are each positioned in a different portion of a railroad track 164 proximate to but oppositely spaced apart from the designated section of the railroad track 164 about which a magnetic rotor assembly 110 and generator assembly 120 of the present kinetic energy conversion system 100 are disposed.

A pressure sensor 144 in accordance with the present invention is positioned in a portion of the railroad track 164 and is actuated by the weight of a railroad car 162 thereon. As such, when actuated, at least one pressure sensor 144 installed in a spaced apart distance from the designated section of railroad track 164 can transmit a signal to a controller 142 to alert a control assembly 140 of the approach of one or more railroad cars 162 towards the designated section of railroad track 164 about which a magnetic rotor assembly 110 of the present kinetic energy conversion system 100 is disposed. Additionally, a pressure sensor 144 positioned in a portion of the railroad track 164 can detect the passing of a plurality of railroad cars 162 along portion of the railroad track 164 by the absence of weight thereon after actuation. As such, a controller 142 disposed in communication with a generator assembly 120 may transmit a signal to a generator assembly 120 to dispose at least one electrical generator 122 from a static mode into a generating mode, upon actuation of at least one pressure sensor 144. Further, the controller 142 can transmit a signal to a generator assembly 120 to dispose at least one electrical generator unit 122 from a generating mode to a static mode, upon deactuation of at least one pressure sensor 144.

More in particular, in accordance with at least one embodiment of the present invention an electrical generator unit 122 may be disposed into an inoperative static mode in the absence of railroad cars 162 moving along the designated section of the railroad track 164 which would cause at least one rotor unit 111 and an axle attached thereto to rotate, thus causing rotation of an armature 123 of the electrical generator unit 122. Alternatively, an electrical generator unit 122 may be disposed into an operative generating mode while one or more railroad cars 162 are moving along the designated section of the railroad track 164 thereby causing at least one rotor unit 111 and an axle 113 attached thereto to rotate, thus rotating an interconnected armature 123 relative to a stator 124 of the electrical generator unit 122, thereby generating an amount of electrical energy therefrom.

Looking again to FIG. 2, in at least one embodiment of the present system 100, a control assembly 140 comprises a plurality of pressure sensors 144 disposed in communication with a controller 142, wherein the plurality of pressure sensors 144 are positioned in different portions of a railroad track 164 proximate to but oppositely spaced apart from the designated section of the railroad track 164 about which the present kinetic energy conversion system 100 is disposed. As such, the plurality of pressure sensors 144 can detect not only the approach of the plurality of railroad cars 162 towards the present kinetic energy conversion system 100 upon actuation of one of the plurality of pressure sensors 144, but they can detect the passing of the plurality of railroad cars 162 upon deactuation of the oppositely disposed one of the plurality of pressure sensors 144. Further, by having a plurality of pressure sensors 144 positioned in different portions of railroad track 164 oppositely spaced apart from the designated section of the railroad track 164 where a kinetic energy conversion system 100 in accordance with the present invention is disposed, the plurality of pressure sensors 144 can detect a direction of travel 163 of the plurality of railroad cars 162 along the railroad track 164. As such, the controller 142 disposed in communication with a generator assembly 120 can signal each of a plurality of bidirectional electrical generating units 122 to dispose each into a generating mode corresponding to a rotational direction 119 of a corresponding armature 123 relative to a stator 124 disposed therein based upon a direction of travel 163 of the plurality of railroad cars 162 along the railroad track 164.

In at least one further embodiment, a control assembly 140 in accordance with the present invention further comprises at least one laser sensor 146 which generates at least one laser beam 147 in order to detect a height of a railroad car 162 relative to a portion of a magnet 116 mounted to a rotor unit 111. In yet one other embodiment, a control assembly 140 comprises a plurality of laser sensors 146 each generating a plurality of laser beams 147 in order to detect a height of a railroad car 162, such as is shown by way of example in FIG. 1. With reference to FIG. 2, a plurality of laser sensors 146 of control assembly 140 generate a plurality of laser beams 147 which are utilized to determine a rotor clearance 136 between a distal end 117' of a magnet 116 mounted to a rotor unit 111 and an upper surface 162' of a railroad car 162 which is moving thereunder along the designated portion of the railroad track 164. More in particular, one or more laser sensors 146 transmit signals to a controller 142 regarding a rotor clearance 136 detected, such that the controller 142 may signal a rotor unit 111 of a magnetic rotor assembly 110 to retract or extend a distal end 117' of a magnet 116 disposed within a magnet housing 118, so as to maintain an optimal rotor clearance 136 for the generation of electrical energy via the present kinetic energy conversion system 100.

Figure 4:
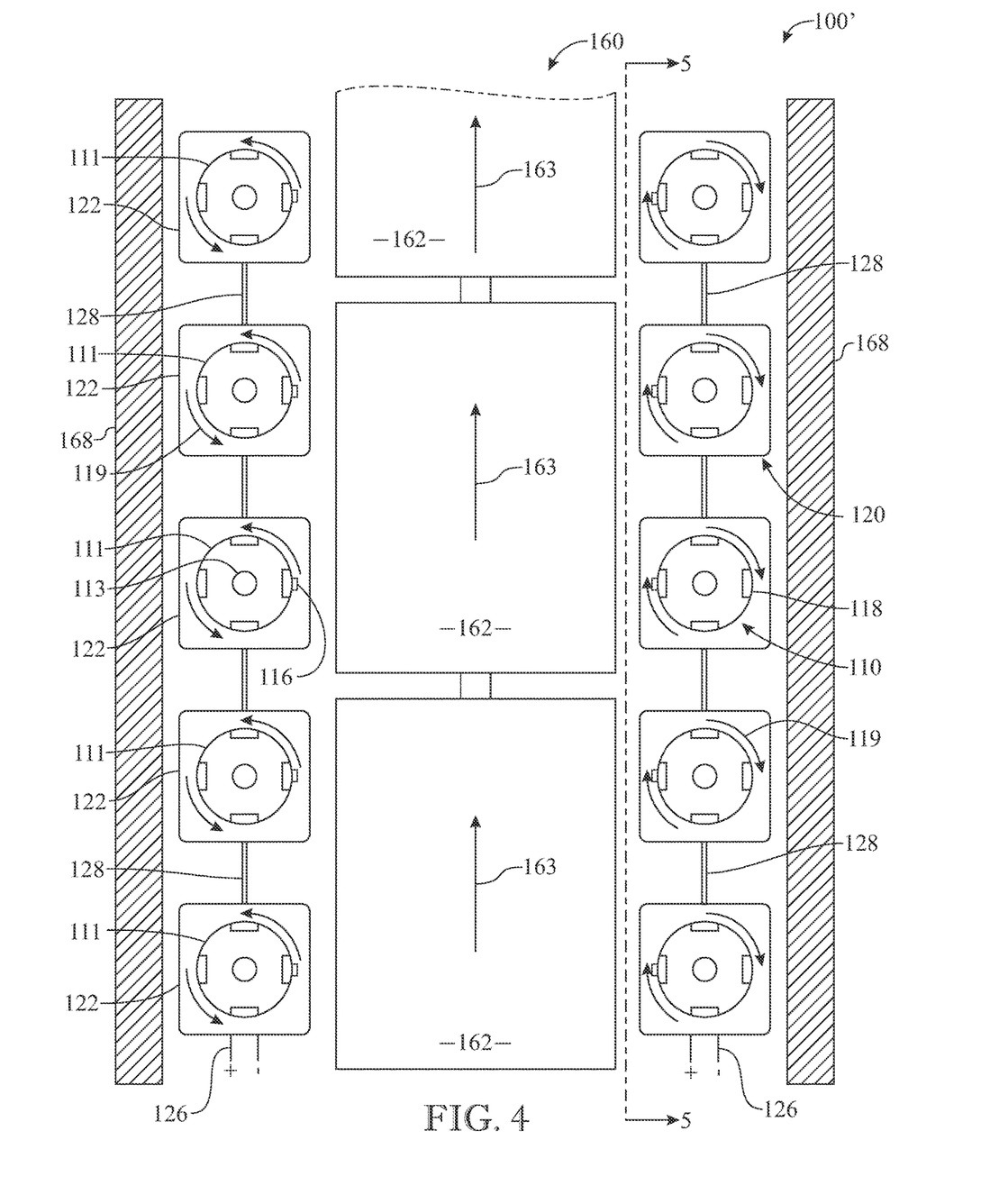
FIG. 4 presents a top plan view of one alternative illustrative embodiment of a kinetic energy conversion system, in accordance with the present invention.
Figure 5:
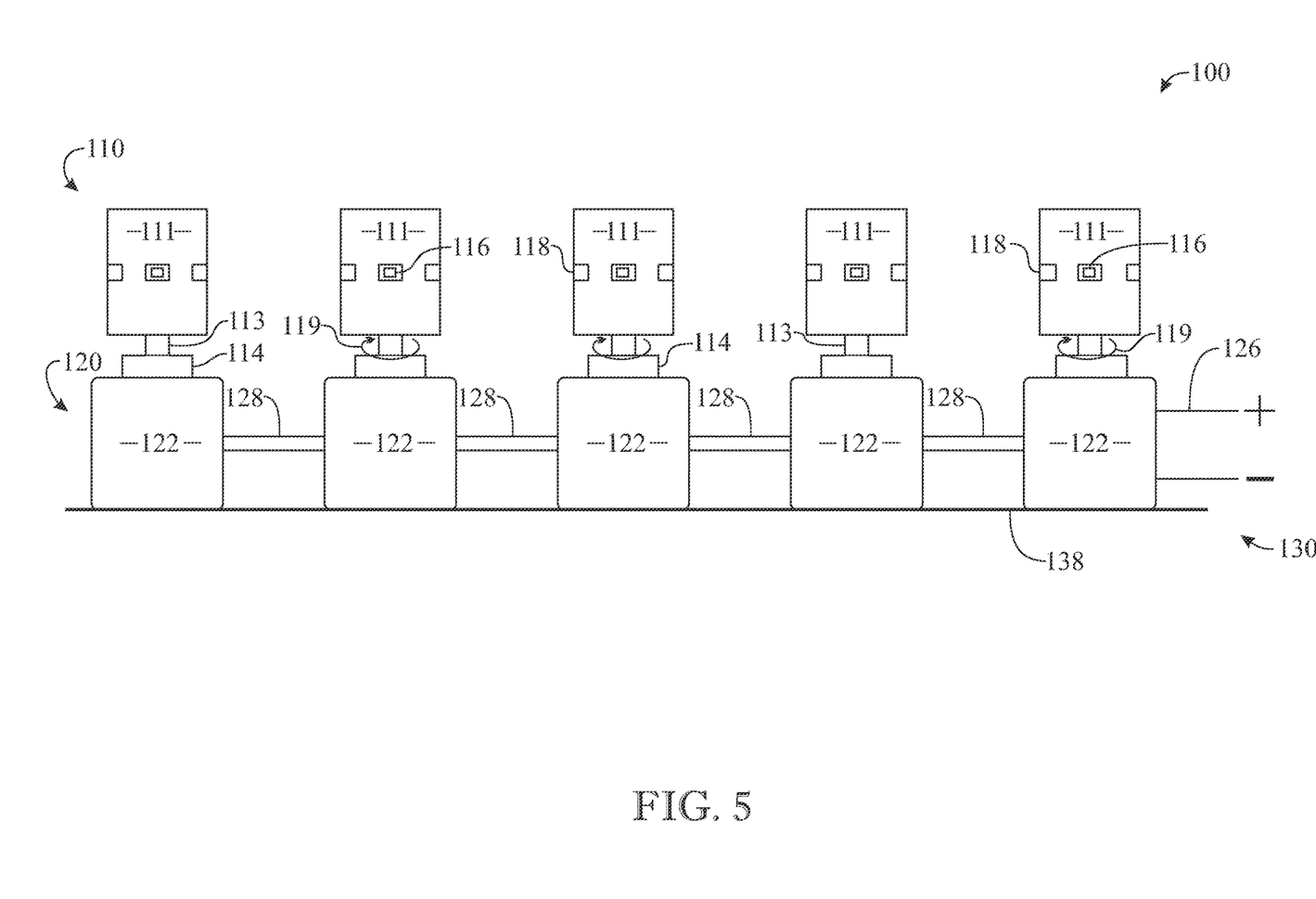
FIG. 5 presents a partial elevation of the alternative illustrative embodiment of the kinetic energy conversion system of FIG. 4 along lines 5-5 thereof, in accordance with the present invention.

Alternative embodiments are contemplated in addition the embodiments shown and/or described hereinabove. For example, FIGS. 4 and 5 present a top plan view and a partial elevation of one alternative illustrative embodiment of a kinetic energy conversion system, generally as shown as at 100', in accordance with the present invention. As before, a kinetic energy conversion system 100' includes a magnetic rotor assembly 110 disposed in and operative engagement with a generator assembly 120. As may be seen from FIGS. 4 and 5, a magnetic rotor assembly 110 of a kinetic energy conversion system 100' comprises a plurality of rotor units 111 each having a plurality of magnets 116 mounted thereto in a spaced apart configuration, as before. Also as before, at least one embodiment of a rotor unit 111 of the alternative embodiment of a kinetic energy conversion system 100' includes a plurality of magnets 116 each disposed in a corresponding one of a plurality of magnet housings 118 attached to the rotor unit 111.

As further shown in FIGS. 4 and 5, a generator assembly 120 of the alternate embodiment of a kinetic energy conversion system 100' includes a plurality of electrical generator units 122 each disposed in an operative engagement with the corresponding one of a plurality of rotor units 111 of a magnetic rotor assembly 110 via a corresponding axle 113 attached thereto. As before, an axle bearing unit 114 may be provided to support as well as to facilitate rotation of an axle 113 upon rotation of the rotor unit 111 to which it is attached. In at least one embodiment, a magnetic rotor assembly 110 of a kinetic energy conversion system 100' comprises a plurality of rotor units 111 disposed in spaced apart configuration along opposite sides of a plurality of railroad cars 162 traveling along the designated portion of the railroad track 164 which, as shown best in the illustrative embodiment of FIG. 4, comprises a railway tunnel 168. Further, each of a plurality of electrical generator units 122 of the generator assembly 120 in accordance with at least one embodiment of a kinetic energy conversion system 100' are disposed in generally series arrangement interconnected to one another via a corresponding plurality of generator interconnects 128. A support assembly 130 comprising a generator base 138 is provided in at least one embodiment to mount each of the plurality of electrical generator units 122 in an operative position relative to one another in a tunnel 168. As before, a generator assembly 120 comprises at least one electrical output interface 126 to transfer the amount of electrical energy generated by the generator assembly 120 of a kinetic energy conversion system 100' in a usable form such as, once again, by way of example only, to a storage battery array or to an electrical grid proximate the present kinetic energy conversion system 100'.

In operation, and similar to the embodiment of the kinetic energy conversion system 100 as shown in the illustrative embodiments of FIGS. 1 through 3, movement of a plurality of railroad cars 162 in a direction of travel 163 proximate a plurality of rotor units 111 of a magnetic rotor assembly 110 of the present kinetic energy conversion system 100', wherein each of the plurality of rotor units 111 is disposed in a magnetically proximate orientation such that a plurality of magnets 116 mounted to each rotor unit 111 are disposed in a magnetically attractive orientation relative to the plurality of railroad cars 162 which are constructed at least partially of ferrous material, causes an axle 113 of each of the plurality of rotor units 111 to rotate in a corresponding rotational direction 119, which in turn causes an armature 123 interconnected to a corresponding one of each of the plurality of axle 113 to rotate as well relative to a stator 124 in a corresponding one of a plurality of electrical generator units 122, thereby generating an amount of electrical energy from the kinetic energy of the plurality of railroad cars 162 moving along a designated section of railroad track 164.

One alterative embodiment of a magnetic rotor assembly 110' of a kinetic energy conversion system in accordance with the present invention is presented in FIG. 6. More in particular, FIG. 6 is a partial cutaway side elevation of one alternative illustrative embodiment of a magnetic rotor assembly 110' of a kinetic energy conversion system 100, in accordance with the present invention, wherein a rotor unit 111 further comprises an accelerator assembly 150. An accelerator assembly 150 in accordance with at least one embodiment of the present invention comprises at least one accelerator fin 152 attached to a portion of a rotor unit 111 and comprising an aerodynamically deflecting configuration so as to minimize air drag on the rotor unit 111 and, once again, to further facilitate rotation thereof for purposes of generating an amount of electrical energy. More in particular, each accelerator fin 152 is dimensioned and configured to provide a smooth transitional surface for airflow over and around a corresponding one of a plurality of magnets 116 and/or a corresponding one of a plurality of magnet housings 118 attached to a rotor unit 111 during rotation thereof.

Looking once again to the illustrative embodiment of FIG. 6, in at least one further embodiment, an accelerator assembly 150 comprises a plurality of accelerator fins 152 attached to portions of a rotor unit 111. In at least one embodiment, one or more of a plurality of accelerator fins 152 are movably attached to portions of an outer surface 112 of the rotor unit 111. As such, a fin mount 154 is provided in at least one embodiment of the present invention to facilitate movable attachment of each of a plurality of accelerator fins 152 to an outer surface 112 of a rotor unit 111. As may be seen from the illustrative embodiment of FIG. 6, accelerator fins 152 are movable about fin mount 154 to allow accelerator fins 152 to move between a first position, shown in solid lines, and a second position, shown in dashed lines, dependent upon the rotational direction 119 of the rotor unit 111 about a rotational axis 115 therethrough. As such, regardless of the rotational direction 119 of a rotor unit 111, i.e., forward or backward, clockwise or counter-clockwise, or otherwise, each of a plurality of accelerator fins 152 provides a smooth transitional surface for airflow over and around a corresponding one of a plurality of magnets 116 and/or a corresponding one of a plurality of magnet housings 118 attached to a rotor unit 111 during rotation thereof.

Figure 7:
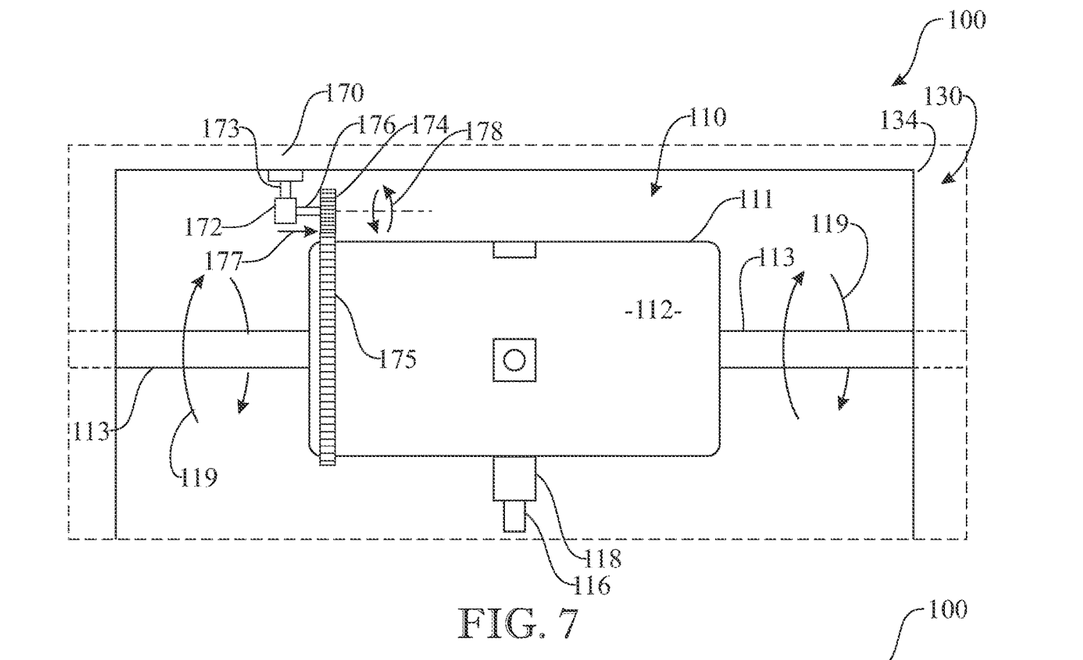
FIG. 7 presents a partial elevation of a further alternative illustrative embodiment of a kinetic energy conversion system having a starter motor assembly engaged with a portion of a rotor unit, in accordance with the present invention.
Figure 8:
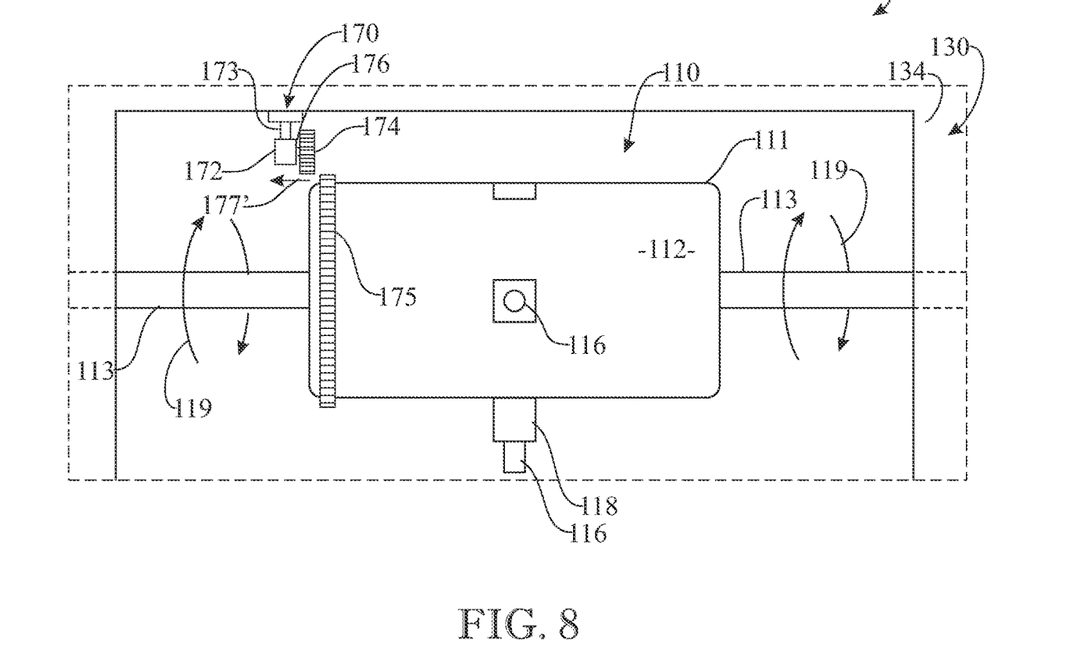
FIG. 8 presents a partial elevation of the further alternative illustrative embodiment of FIG. 7 having a starter motor assembly disengaged from the portion of the rotor unit, in accordance with the present invention.

Looking next to FIGS. 7 and 8, presented therein are partial elevations of yet one further alternative embodiment of a kinetic energy conversion system 100, in accordance with the present invention. More in particular, the kinetic energy conversion system 100 as shown in FIGS. 7 and 8 further comprises a starter motor assembly 170 which is operative with a rotor unit 111 of a magnetic rotor assembly 110. As before, a magnetic rotor assembly 110 in accordance with the present invention comprises at least one rotor unit 111 having a generally cylindrical configuration having an outer surface 112 and a circumference disposed therearound. Also as before, a magnetic rotor assembly 110 further comprises an axle 113 attached to the rotor unit 111, wherein the axle 113 is rotational with the rotor unit 111 about a rotational axis thereof. A support assembly 130 having an upper support 134 is provided to maintain the rotor unit 111 of the magnetic rotor assembly 110 in a magnetically proximate orientation relative to a plurality of railroad cars 162 moving proximate thereto along a designated section of a railroad track 164 of a railway network 160, such as is shown best in FIG. 1.

A magnetic rotor assembly 110 in accordance with the present alternative embodiment of a kinetic energy conversion system 100, as before, comprises one or more magnets 116 mounted to a portion of a rotor unit 111 such that a distal end of each magnet 116 is disposed in an outwardly extending and magnetically attractive orientation relative to a plurality of railroad cars 162 moving along a designated section of a railroad track 164 proximate thereto, once again, as shown best in FIG. 1. In at least one embodiment, a magnetic rotor assembly 110 includes a rotor unit 111 having a plurality of magnets 116 each disposed in a corresponding one of a plurality of magnet housings 118 attached thereto in a spaced apart arrangement about the circumference of the outer surface 112 of the rotor unit 111.

With reference again to the alternative illustrative embodiment of FIGS. 7 and 8, a starter motor assembly 170 is provided to engage a rotor unit 111 of a magnetic rotor assembly 110 in advance of oncoming railroad cars 162 passing thereby in order to initiate a rotation the rotor unit 111. As such, a starter motor assembly 170 comprises a starter motor 172 which is mounted to a portion of an upper support 134 via a starter motor mount 173. With reference once again to FIGS. 7 and 8, a starter motor 172 of a starter motor assembly 170 is mounted to a portion of an upper support 134 such that a starter motor drive gear 174 is proximate a rotor unit 111 of a magnetic rotor assembly 110. More in particular, and with continued reference to the illustrative embodiment of FIGS. 7 and 8, the starter motor 172 is mounted to the upper support 134 such that the starter motor drive gear 174 is positionable into and out of engagement with a drive track 175 disposed around a circumference of the rotor unit 111 of the magnetic rotor assembly 110.

In at least one embodiment, a starter motor assembly 170 comprises a clutch coupled drive shaft 176 that is operable to position the starter motor drive gear 174 into and out of engagement with a drive track 175 by extending outwardly from the starter motor 172, as represented by engagement directional arrow 177 in FIG. 7, or by retracting inwardly towards the starter motor 172, as represented by disengagement directional arrow 177' in FIG. 8. The control assembly 140, described hereinabove, is programmed to detect oncoming railroad cars 162 and to cause the clutch coupled drive shaft 176 to extend outwardly from the starter motor 172, as shown in FIG. 7, such that the starter motor drive gear 174 operatively engages the drive track 175 disposed around the circumference of the rotor unit 111. The control assembly 140 is further programmed to actuate the starter motor 172 of the starter motor assembly 170 thereby causing the clutch coupled drive shaft 176 to rotate in the direction shown by directional arrows 178 in FIG. 7, resulting in rotation of the rotor unit 111 in the direction of arrows 119, as also shown in FIG. 7. The control assembly 140 is further programmed to disengage the starter motor drive gear 174 from the drive track 175 on the rotor unit 111 prior to the railroad cars 162 arriving proximate the rotor unit 111, so as to prevent potential damage to the starter motor 172 as a result of the increased rotational velocity of the rotor unit 111 as the railroad cars 162 pass thereby. As will be appreciated, by initiating rotation of a rotor unit 111 prior to railway cars 162 passing thereby, the initial inertial momentum required to cause the rotor unit 111 to move and rotate are overcome, resulting in an increased electricity generating efficiency of the present kinetic energy conversion system 100.

In one embodiment, a drive track 175 may be fixedly attached around a circumference of a rotor unit 111, such as shown in the illustrative embodiments of FIGS. 7 and 8. It is to be appreciated, however, that in at least one embodiment, a drive track 175 may be formed directly into an outer surface 112 of a rotor unit 111 itself. In yet one further embodiment, a rotor unit 111 may have a flywheel (not shown) mounted around a circumference thereof, the flywheel having a drive track 175 formed in or disposed around an outer edge and configured to operatively receive a starter motor drive gear 174 therein. As will be appreciated, a flywheel comprises a mass mounted to a rotor unit 111 and will store inertial energy while the rotor unit 111 is rotated, whether by a starter motor 172 of a starter motor assembly 170 or by magnetically induced rotation forces created by passing railroad cars 162. Thus, a flywheel will serve to continue rotation of a rotor unit 111 well after railroad cars 162 have passed, once again increasing the electricity generating efficiency of the present kinetic energy conversion system 100.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A kinetic energy conversion system configured to generate usable electrical energy from the kinetic energy of a plurality of railroad cars constructed at least partially of ferrous material and moving along a designated section of a railroad track of a railway network, said system comprising:
    a magnetic rotor assembly including at least one rotor unit having at least one magnet mounted thereto, said magnetic rotor assembly further comprising an axle attached to said at least one rotor unit;
    a generator assembly having at least one electrical generator disposed in an operative engagement with said magnetic rotor assembly to generate an amount of electrical energy; and
    a support assembly dimensioned and configured to maintain said at least one rotor unit in a magnetically proximate orientation relative to the plurality of railroad cars moving along the designated section of the railroad track; wherein
    said at least one rotor unit comprises at least one magnet housing, said at least one magnet disposed in said at least one magnet housing, and at least a portion of said at least one magnet is movable out of said at least one magnet housing into a magnetically attractive orientation relative to the plurality of railroad cars moving along the designated section of the railroad track.

2. The system as recited in claim 1, wherein said axle is movable with said at least one rotor unit.

3. The system as recited in claim 1, wherein said axle is rotational with said at least one rotor unit along a rotational axis thereof.

4. The system as recited in claim 1, wherein a magnetically attractive force between said at least one magnet of said at least one rotor unit and the plurality of railroad cars moving along the designated section of the railroad track causes said at least one rotor unit and said axle attached thereto to rotate about a rotational axis thereof.

5. The system as recited in claim 4, wherein said operative engagement between said magnetic rotor assembly and said at least one electrical generator is at least partially defined by a portion of said axle interconnected to an armature disposed in a rotational configuration with a stator in said at least one electrical generator, wherein rotation of said axle causes rotation of said armature relative to said stator, thereby generating said amount of electrical energy.

6. The system as recited in claim 1, wherein the at least one electrical generator comprises a plurality of electrical generators each disposed in an operative engagement with said magnetic rotor assembly to generate said amount of electrical energy.

7. A kinetic energy conversion system configured to generate usable electrical energy from the kinetic energy of a plurality of railroad cars constructed at least partially of ferrous material and moving along a designated section of a railroad track of a railway network, said system comprising:
    a magnetic rotor assembly including at least one rotor unit having a plurality of magnets mounted thereto, said magnetic rotor assembly further comprising an axle attached to said at least one rotor unit, wherein said at least one rotor unit comprises a plurality of magnet housings, wherein each magnet of said plurality of magnets is disposed in a corresponding magnet housing of said plurality of magnet housings and at least a portion of each of said plurality of magnets is moveable out of said corresponding magnet housing into a magnetically attractive orientation relative to the plurality of railroad cars moving along the designated section of the railroad track;
    a generator assembly having at least one electrical generator disposed in an operative engagement with said magnetic rotor assembly to generate an amount of electrical energy; and
    a support assembly dimensioned and configured to maintain said at least one rotor unit in a magnetically proximate orientation relative to the plurality of railroad cars moving along the designated section of the railroad track.

8. The system as recited in claim 7, wherein a magnetically attractive force between successive ones of said plurality of magnets of said at least one rotor unit and the plurality of railroad cars moving along the designated section of the railroad track causes said at least one rotor unit and said axle attached thereto to rotate about a rotational axis thereof.

9. The system as recited in claim 8, wherein said operative engagement between said at least one electrical generator and said magnetic rotor assembly is at least partially defined by a portion of said axle interconnected to an armature disposed in a rotational configuration with a stator in said at least one electrical generator, wherein rotation of said axle causes rotation of said armature relative to said stator, thereby generating said amount of electrical energy.

10. A kinetic energy conversion system configured to generate usable electrical energy from the kinetic energy of a plurality of railroad cars constructed at least partially of ferrous material and moving along a designated section of a railroad track of a railway network, said system comprising:
    a magnetic rotor assembly including at least one rotor unit having at least one magnet mounted thereto, said magnetic rotor assembly further comprising an axle attached to said at least one rotor unit;
    a generator assembly having at least one electrical generator disposed in an operative engagement with said magnetic rotor assembly to generate an amount of electrical energy;
    a support assembly dimensioned and configured to maintain said at least one rotor unit in a magnetically proximate orientation relative to the plurality of railroad cars moving along the designated section of the railroad track; and
    a control assembly having a controller in a communicative relation with said generator assembly to dispose said at least one electrical generator between a static mode and a generating mode, wherein said control assembly further comprises at least one pressure sensor positioned in a portion of the railroad track proximate to the designated section of the railroad track and disposed in communication with said controller, said at least one pressure sensor actuated by the weight of one of the plurality of railroad cars on the portion of the railroad track in which said at least one pressure sensor is positioned.

11. The system as recited in claim 10, wherein upon actuation of said at least one pressure sensor said controller disposes one or more electrical generators of said at least one electrical generator into said generating mode.

12. The system as recited in claim 10, wherein said at least one pressure sensor comprises a plurality of pressure sensors each positioned in a different portion of the railroad track proximate to but oppositely disposed from the designated section of the railroad track and each disposed in communication with said controller, wherein each pressure sensor of said plurality of pressure sensors is independently actuated by the weight of one of the plurality of railroad cars on the portion of the railroad track in which said each pressure sensor is positioned.

13. The system as recited in claim 12, wherein upon actuation of at least one pressure sensor of said plurality of pressure sensors said controller disposes one or more electrical generators of said at least one electrical generator into said generating mode.

14. The system as recited in claim 12, wherein upon actuation of at least one pressure sensor of said plurality of pressure sensors said controller disposes each electrical generator of said at least one electrical generator into said generating mode.

* * * * *